United States Patent [19]

Wang

[11] Patent Number: 5,706,585
[45] Date of Patent: Jan. 13, 1998

[54] FOLDABLE HACKSAW

[76] Inventor: Henry Wang, No. 53, Dong San Road, Chin Shui Town, Taichung Hsien, Taiwan

[21] Appl. No.: 713,009

[22] Filed: Sep. 12, 1996

[51] Int. Cl.$^6$ ........................................ B27B 21/02
[52] U.S. Cl. ........................................ 30/512; 30/513
[58] Field of Search ........................ 30/512, 513, 510, 30/511, 507

[56] References Cited

U.S. PATENT DOCUMENTS 2,930,420  3/1960  Brion .................................... 30/512
4,499,936  2/1985  Nilsson ................................. 30/512

*Primary Examiner*—Douglas D. Watts
*Attorney, Agent, or Firm*—Charles E. Baxley, Esq.

[57] ABSTRACT

A hacksaw includes a beam having two ends receivable in a tube and a handle. The tube and the handle each has an orifice and an aperture formed in one end for engaging with the ends of the beam and for maintaining the beam in a vertical position relative to the tube and the handle. A saw blade includes two ends secured to the other ends of the tube and the handle so as to form the hacksaw. The two ends of the beam are received in the tube and the handle so as to form a compact folded configuration when the saw blade is disengaged from the tube and said handle.

3 Claims, 3 Drawing Sheets

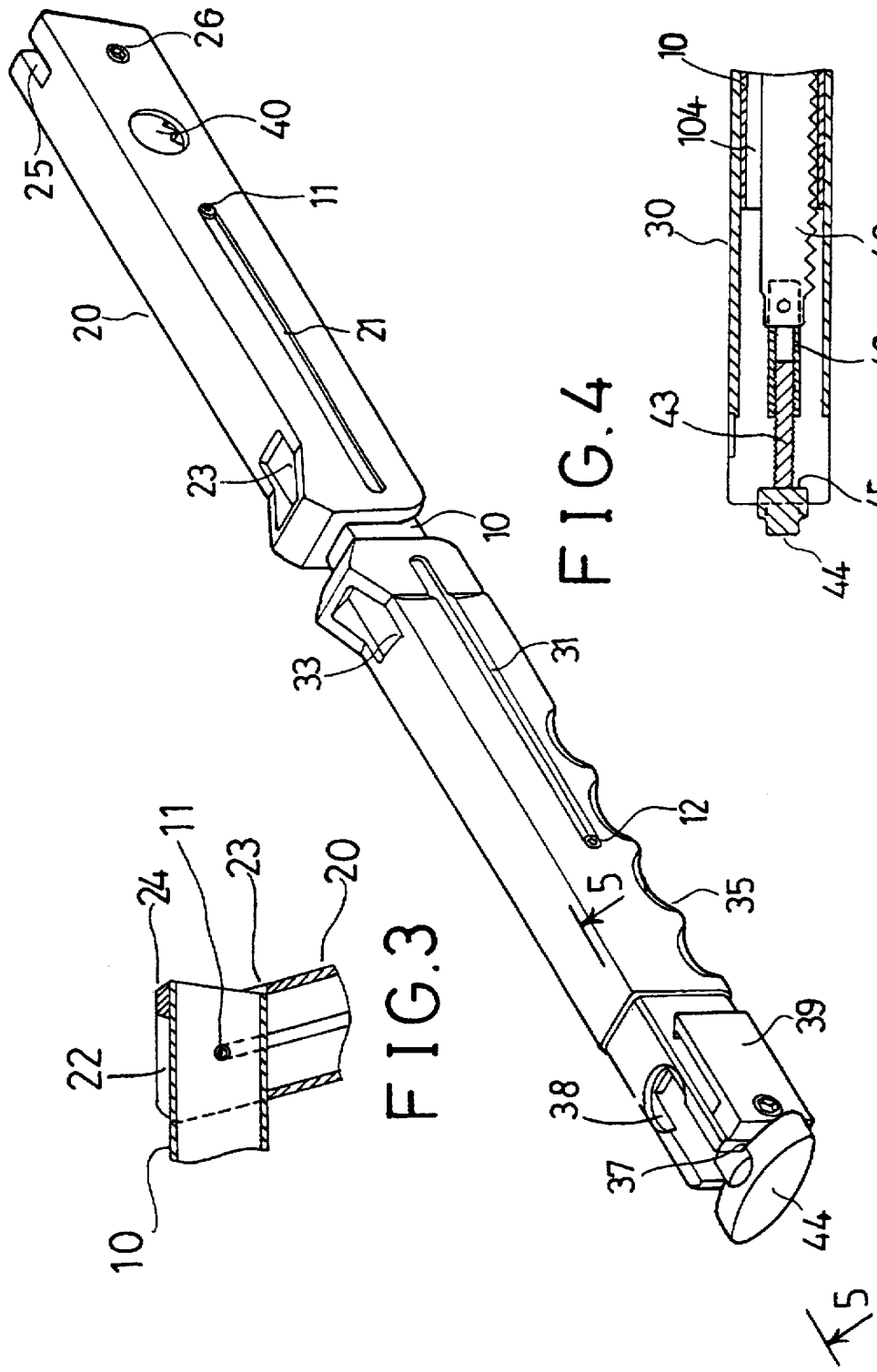

FOLDABLE HACKSAW

BACKGROUND OF THE INVENTION

1. Field of the Invention

The present invention relates to a hacksaw, and more particularly to a foldable hacksaw.

2. Description of the Prior Art

Typical hacksaws comprise a U-shaped frame including a pair of parallel arms and a beam solidly secured on one end of the arms. A saw blade is secured between the other ends of the arms. The beam and the arms are solidly formed and may not be folded to a compact configuration such that the volume of the hacksaw may not be decreased.

The present invention has arisen to mitigate and/or obviate the afore-described disadvantages of the conventional hacksaws.

SUMMARY OF THE INVENTION

The primary objective of the present invention is to provide a hacksaw which is foldable to a compact configuration for facilitating the transportation and storing effects.

In accordance with one aspect of the invention, there is provided a hacksaw comprising a beam including a first end and a second end, a tube including an interior for receiving the first end of the beam, the tube including a first end having an orifice formed therein for engaging with the first end of the beam and for maintaining the beam in a vertical position relative to the tube, the tube including a second end, a handle including an interior for receiving the second end of the beam, the handle including a first end having an aperture formed therein for engaging with the second end of the beam and for maintaining the beam in a vertical position relative to the handle, the handle including a second end, a saw blade, and means for securing the saw blade to the second ends of the tube and the handle. The two end portions of the beam are allowed to be engaged in the interiors of the tube and the handle so as to form a compact folded configuration when the first end of the beam is disengaged from the orifice and when the second end of the beam is disengaged from the aperture.

The tube includes at least one first channel formed therein, the handle includes at least one second channel formed therein, the beam includes a first pin secured to the first end thereof for slidably engaging with the first channel of the tube, and includes a second pin secured to the second end thereof for slidably engaging with the second channel of the handle. The sliding engagement of the pins in the channels may guide the sliding movement of the beam in the tube and the handle and may limit the sliding movement of the beam in the tube and in the handle.

The saw blade includes a first end and a second end, the second end of the tube includes a first notch for engaging with the first end of the saw blade, the second end of the handle includes a second notch, the securing means includes a first fastening member for securing the first end of the saw blade to the tube, a follower slidably engaged in the second notch of the handle, a second fastening member for securing the second end of the saw blade to the follower, a bolt threadedly engaging with the follower, and a knob engaged with the second end of the handle and secured to the bolt for rotating the bolt and for moving the follower toward and away from the knob.

The handle includes an engaging hook secured to the second end for engaging with a waistband of a user.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is a partial cross sectional view taken along lines 3—3 of FIG. 2;

FIG. 4 is a perspective view illustrating the folded condition of the hacksaw; and FIG. 5 is a partial cross sectional view taken along lines 5—5 of FIG. 4.

DETAILED DESCRIPTION OF THE PREFERRED EMBODIMENT

Figure 1:
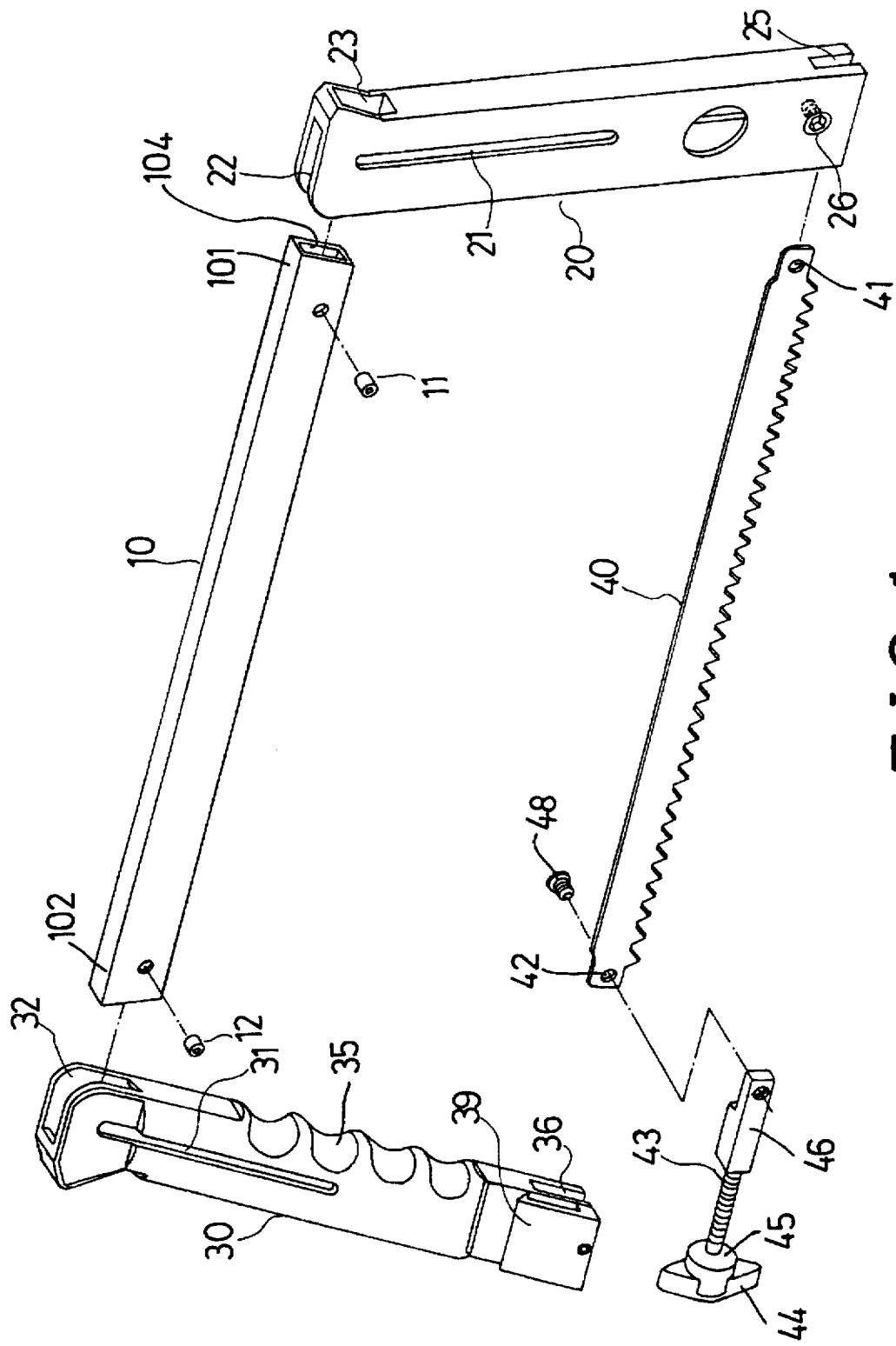
FIG. 1 is an exploded view of a hacksaw in accordance with the present invention.
Figure 2:
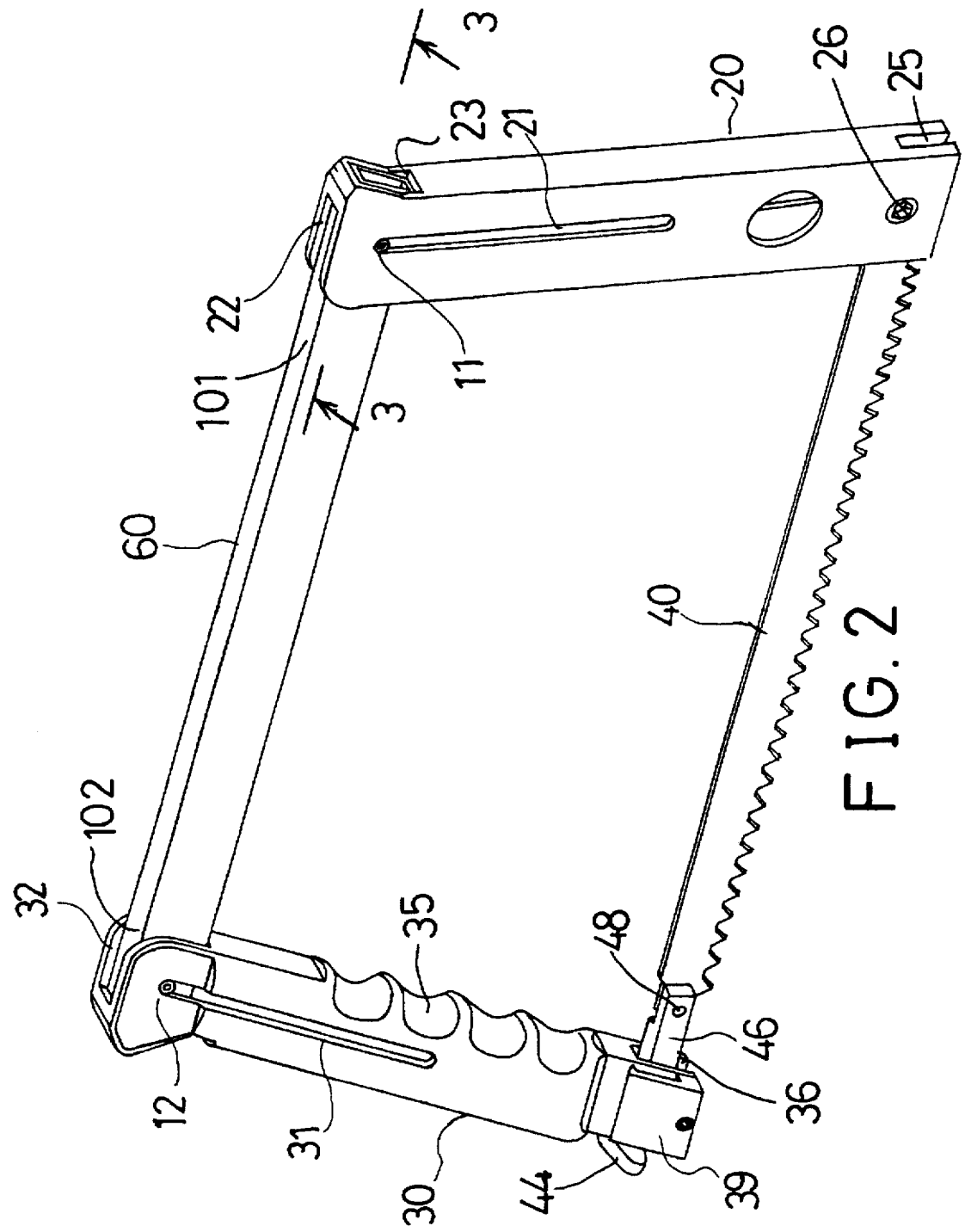
FIG. 2 is a perspective view of the hacksaw.

Referring to the drawings, and initially to FIGS. 1 to 3, a hacksaw in accordance with the present invention comprises a beam 10 including two pins 11, 12 secured to two ends 101, 102 thereof respectively and including a hollow interior 104 which is large enough for storing one or more saw blades 40. A tube 20 includes an interior 22 for engaging with the beam 10 and for allowing the beam 10 to be engaged into the tube 20 (FIG. 4). The tube 20 includes one or a pair of channels 21 formed in the side portions for slidably engaging with the pin 11 and for guiding the sliding movement of the beam 10 in the interior 22 of the tube 20. The length of the channel 21 may limit the sliding movement of the beam 10 in the tube 20. The tube 20 includes an orifice 23 formed in the side portion of a first end thereof for engaging with the first end of the beam 10 and for maintaining the beam 10 in a vertical position relative to the tube 20, best shown in FIGS. 2 and 3. The tube 20 includes a notch 25 formed in the second end for engaging with one end of the saw blade 40. A fastening member 26 is engaged in the second end of the tube 20 and engaged through the hole 41 of the saw blade 40 for securing the saw blade 40 to the tube 20.

A handle 30 includes an interior 32 for engaging with the beam 10 and for allowing the beam 10 to be engaged into the handle 30 (FIGS. 4 and 5). The handle 30 includes one or a pair of channels 31 formed in the side portions for slidably engaging with the pin 12 and for guiding the sliding movement of the beam 10 in the interior 32 of the handle 30. The length of the channel 31 may limit the sliding movement of the beam 10 in the handle 30. The handle 30 includes an aperture 33 formed in the side portion of a first end thereof (FIG. 4) for engaging with the second end 102 of the beam 10 and for maintaining the beam 10 in a vertical position relative to the handle 30, best shown in FIG. 2. The handle 30 includes a number of depressions 35 for engaging with the fingers of the user and includes a notch 36 formed in the second end for engaging with a follower 46 which is secured to the other end of the saw blade 40 by a fastening member 48 (FIGS. 1 and 2). The second end of the handle 30 includes a recess 38 formed in the side portion and another recess 37 formed in the tip (FIG. 4). A bolt 43 is threadedly engaged with the follower 46 (FIG. 5) and includes a knob 44 secured thereto for rotating the bolt 43. The knob 44 includes a hub 45 for rotatably engaging in either of the recesses 37, 38 and for allowing the knob 44 to be rotatably engaged with the handle 30. The follower 46 may be moved toward or away from the knob 44 when the knob 44 is rotated such that the saw blade may be stretched and retained in place or may be released. A hook 39 is secured to the second end of the handle 30 for hanging the saw onto the waistband of the user.

Referring next to FIGS. 4 and 5, when the saw blade 40 is disengaged from the follower 46 and the tube 20, the saw blade 40 may be engaged in the beam 10 for storing purposes. When the ends of the beam 10 are disengaged from the orifice 23 and the aperture 33, the two ends of the beam 10 may be engaged into the tube 20 and the handle 30 so as to be folded to a compact configuration which is excellent for storing and transportation purposes.

Accordingly, the hacksaw in accordance with the present invention includes a configuration that may be folded to a compact configuration for facilitating the storing and transportation effects thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hacksaw comprising:

a beam including a first end and a second end, a tube including an interior for receiving said first end of said beam, said tube including a first end having an orifice formed therein for engaging with said first end of said beam and for maintaining said beam in a vertical position relative to said tube, said tube including a second end, a handle including an interior for receiving said second end of said beam, said handle including a first end having an aperture formed therein for engaging with said second end of said beam and for maintaining said beam in a vertical position relative to said handle, said handle including a second end and including an engaging hook secured to said second end for engaging with a waistband of a user, a saw blade, and means for securing said saw blade to said second ends of said tube and said handle, said beam being allowed to be engaged in said interiors of said tube and said handle when said first end of said beam is disengaged from said orifice and when said second end of said beam is disengaged from said aperture.

2. A hacksaw according to claim 1, wherein said tube includes at least one first channel formed therein, said handle includes at least one second channel formed therein, said beam includes a first pin secured to said first end thereof for slidably engaging with said first channel of said tube, and includes a second pin secured to said second end thereof for slidably engaging with said second channel of said handle.

3. A hacksaw according to claim 1, wherein said saw blade includes a first end and a second end, said second end of said tube includes a first notch for engaging with said first end of said saw blade, said second end of said handle includes a second notch, said securing means includes a first fastening member for securing said first end of said saw blade to said tube, a follower slidably engaged in said second notch of said handle, a second fastening member for securing said second end of said saw blade to said follower, a bolt threadedly engaging with said follower, and a knob engaged with said second end of said handle and secured to said bolt for rotating said bolt and for moving said follower toward and away from said knob.

* * * * *